United States Patent [19]
Taguchi et al.

[11] Patent Number: 5,737,924
[45] Date of Patent: Apr. 14, 1998

[54] GAS COMPRESSOR EXPANDER

[75] Inventors: Kenji Taguchi, Gunma; Takahiro Nakamura, Kyoto; Shinichi Matsumura; Yasuyuki Kuwaki, both of Osaka; Takafumi Nakayama, Hyogo, all of Japan

[73] Assignee: Sanyo Electric Co., Ltd., Moriguchi, Japan

[21] Appl. No.: 688,259

[22] Filed: Jul. 29, 1996

[30]   Foreign Application Priority Data

Sep. 19, 1995 [JP] Japan .................................. 7-239544

[51] Int. Cl.[6] ............................................ F25B 9/00
[52] U.S. Cl. ................................ 62/6; 60/517; 60/520; 60/525
[58] Field of Search ............................. 62/6; 60/517, 520, 60/525

[56]   References Cited

U.S. PATENT DOCUMENTS 4,712,378  12/1987  Nakayama ........................ 60/525

FOREIGN PATENT DOCUMENTS 3-90295     4/1991   Japan .
WO 94/15117  7/1994  Japan .
WO 94/15118  7/1994  Japan .

*Primary Examiner*—Henry A. Bennett
*Assistant Examiner*—Pamela A. O'Connor
*Attorney, Agent, or Firm*—Armstrong, Westerman, Hattori, McLeland & Naughton

[57] ABSTRACT

The weight of crank mechanism portion is reduced and driving force efficiency is improved by reducing in the friction loss in the driving force on the side of a compression piston. A gas compressor expander includes a first expansion cylinder and a first displacer arranged in a T shape, a first connecting lever, a first compression cylinder, a first compression piston, a second expansion cylinder and a second displacer also arranged in a T shape, a second connecting lever, a second compression cylinder, a second compression piston. A first expansion chamber, a first compression chamber, and a third compression chamber are communicated through a first communicating tube, while a second expansion chamber, a second compression chamber, and a fourth compression chamber are communicated through a second communicating tube.

4 Claims, 8 Drawing Sheets

GAS COMPRESSOR EXPANDER

BACKGROUND OF THE INVENTION

1. Field of the Invention

The present invention relates generally to gas compressor expanders, such as Stirling engines used for generating low temperature states, and more particularly, to a gas compressor expander with an increased movement efficiency of a compression piston in a compression chamber.

2. Description of the Background Art

The Stirling engine has been much studied and developed as one kind of gas compressor expander, because it theoretically has a very high thermal efficiency, allows use of various kinds of heat sources other than petroleum, and is quiet and harmless to the public.

The Stirling freezer, the reverse of the Stirling engine in cycle, attracts much attention for the same reasons and particularly because it does not require any refrigerant harmful to the global environment, such as chlorofluorocarbon.

Referring to FIG. 8, the structure of a Stirling freezer of the displacer type will be described.

A main housing 101 is attached with an expansion cylinder 102 and a compression cylinder 103 with an angle difference of 90° therebetween. A displacer 106 accommodated in expansion cylinder 102 and a compression piston 107 accommodated in compression cylinder 103 are coupled to a common crank mechanism 105 such that they can reciprocate with their phases shifted from each other.

Displacer 106 is coupled with a transmission rod 119 and a connecting rod 115, and compression piston 107 is coupled with a transmission rod 120 and a connecting rod 116.

Displacer 106 is filled with a storage medium 114 formed of a sintered metal, for example, and a working medium (gas) flowed in from one opening of displacer 106 is passed through the inside of storage medium 114 and output from the other opening, during which process heat exchange with storage medium 114 is conducted.

Displacer 106 also functions as a regenerative heat exchanger, and the heat exchange property greatly affects the coefficient of performance of the Stirling freezer.

There is provided a communication space 125 communicating with an expansion chamber 111 in expansion cylinder 102 and a crankcase 112 accommodating a crank mechanism 105. Communicating space 125 is provided with an oil seal 121 for preventing lubricant 110 from coming into expansion chamber 111 from crankcase 112, and a cross guide member 117 for supporting oil seal 121 and having a guide face 117A for restricting the direction of reciprocation of a cross guide 115A provided at rod 119.

There is provided a communicating space 126 communicating between a compression chamber 113 in compression cylinder 103 and crankcase 112.

Communicating space 126 is provided with an oil seal 122 for preventing lubricant 110 from coming into compression chamber 113 from crankcase 112, and a guide member 118 for supporting oil seal 112 and having a guide face 118A for restricting the direction of reciprocation of a cross guide 116A provided at transmission rod 120.

The proximal end of expansion cylinder 102 is communicated with the distal end of compression cylinder 103 through a communicating tube 104.

Referring to FIG. 9, the operation of the Stirling freezer will be described. Note that the graph in FIG. 9 shows time T as the abscissa and stroke S as the ordinate.

In the Stirling freezer, as displacer 106 reciprocates in the way as denoted by curves B and C in FIG. 9, compression piston 107 reciprocates in the way as denoted by curve D. Expansion chamber 111 of expansion cylinder 102 thus changes in volume in the region between straight line A and curve B in FIG. 9, while the compression chamber 113 of compression cylinder 103 changes in volume in the region between curve C and curve D in FIG. 9.

As a result, in the process shown as (i) in FIG. 9, the working medium within compression chamber 113 is compressed and flows into expansion cylinder 102 through communicating tube 104 (isothermal compression). The working medium is passed through storage medium 114 in displacer 106 for heat exchange with storage medium 114 in the process shown as (ii) in FIG. 9 and decreases in temperature (isometric cooling).

The medium passed through storage medium 114 flows into the expansion chamber 111 of expansion cylinder 102 in the process shown as (iii) in FIG. 9 and then expands as displacer 106 is lowered (isothermal expansion).

Now in the process shown as (iv) in FIG. 9, as displacer 106 is elevated, the working medium in expansion chamber 111 is passed through storage medium 114 for heat exchange therewith, increases in temperature, and then once again flows into compression chamber 113 through communicating tube 104 (isometric heating).

A cold head 115 provided at the head of expansion cylinder 2 is cooled.

This Stirling freezer is however encountered with the following problem.

The working medium is compressed on the side of compression piston. At the time, connecting rod 116 is slanted with the rotation of crank mechanism 105. The force transmitted from crank mechanism therefore generates a force of pressing cross guide 116A provided at the coupling portion between connecting rod 116 and transmission rod 120 against the guide face 118A of guide member 118 in addition to moving compression piston 107. Friction is therefore caused between cross guide 116A and guide face 118A, thereby generating a friction loss in the force from crank mechanism 105.

As a result, the driving device for driving crank mechanism 105 must be expanded in size in order to improve the rigidity of the crank mechanism portion.

SUMMARY OF THE INVENTION

It is an object of the invention to provide a Stirling engine with a crank mechanism portion of reduced weight and an improved driving efficiency, by reducing the friction loss in the driving force on the side of the compression piston.

In order to achieve the above object, according to one aspect of the invention, the Stirling engine includes an expansion cylinder, a displacer reciprocating in an expansion chamber in the expansion cylinder, a connecting lever having one end coupled to the displacer, a crank mechanism portion coupled to the connecting lever at approximately the center thereof for causing the displacer to reciprocate, a compression cylinder provided in a direction crossing the direction of reciprocation of the displacer at a position opposite to the expansion cylinder with crank mechanism portion therebetween, a compression piston coupled to the other end of connecting lever for reciprocating in a compression chamber in the compression cylinder, and a communicating tube communicating between the expansion chamber and the compression chamber.

By the functions and effects resulting from the above structure, the compression piston moves in a direction crossing the direction of movement of the connecting lever. As for the compression piston, the force pressed against the inside of the compression cylinder is smaller than in conventional cases, and a loss in the force from the crank mechanism portion caused by the friction between the compression piston and the inside of compression cylinder can be reduced.

Since the displacement of the compression piston draws a complete sine curve, the working medium is compressed by the compression cylinder in a longer time period, and therefore the compression efficiency of the working medium can be improved.

In addition, the strokes of the crank mechanism are smaller than those of the conventional Stirling engines, and therefore the rigidity of the crank mechanism is improved with oscillation being reduced.

In order to achieve the above-described object, according to another aspect of the invention, the Stirling engine includes first and second expansion cylinders, a first displacer for moving in a first expansion chamber in the first expansion cylinder in a reciprocative manner, a second displacer for moving in a second expansion chamber in the second expansion cylinder in a reciprocative manner, a first connecting lever having one end coupled with the first displacer, a second connecting lever having one end connected with the second displacer, a first crank mechanism portion coupled with the first connecting lever approximately at its center for causing the first displacer to reciprocate through the first connecting lever, a second crank mechanism portion having a phase angle of 180° with the first crank mechanism portion and coupled with the second connecting lever approximately at its center for causing the second displacer to reciprocate through the second connecting lever, a first compression cylinder having a first compression chamber and a second compression chamber provided in a direction crossing the direction of reciprocation of the first displacer at a position opposite to the expansion cylinder with the first crank mechanism portion therebetween, a second compression cylinder having a third compression chamber and a fourth compression chamber provided in a direction crossing the direction of reciprocation of the second displacer at a position opposite to the second expansion cylinder with the second crank mechanism therebetween, a first compression piston coupled with the other end of the first connecting lever for reciprocating between the first and second compression chambers, a second compression piston coupled with the other end of second connecting lever for reciprocating between the third and fourth compression chambers, a first communicating tube communicating between the first expansion chamber, the first compression chamber and the third compression chamber, and a second communicating tube communicating between the second expansion chamber, the second compression chamber and the fourth compression chamber.

The structure provides additional functions and effects as well as the above-described functions and effects.

More specifically, when the first expansion chamber, the first compression chamber and the third compression chamber, and the second expansion chamber, the second compression chamber and the fourth compression chamber are communicated with each other with the phase angle of 180° being provided between the first crank mechanism portion and the second crank mechanism portion and thus the working medium is compressed in the first compression chamber by the function of the first compression piston, for example, and the working medium is compressed in the third compression chamber by the function of the second compression piston at the same time. At the time, the working medium is input to the second and fourth compression chambers from the second expansion chamber.

The first and second compression pistons are always balanced in pressure by pressures in the compression chambers formed on both sides, well-balanced reciprocation can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
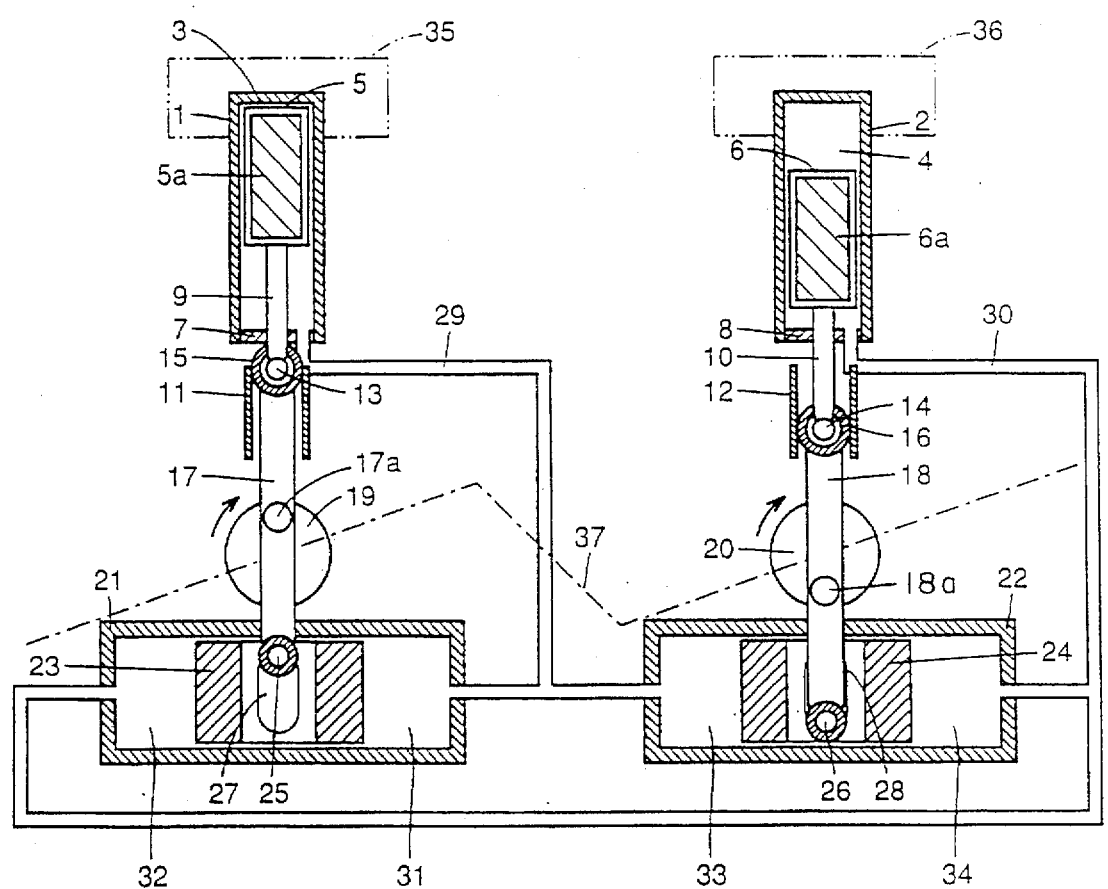
FIG. 1 is a cross sectional view showing the structure of a Stirling freezer according to an embodiment of the invention.

An embodiment of the present invention will be described by illustrating an application of a gas compressor expander of a Stirling freezer-type in conjunction with the accompanying drawings. Referring to FIG. 1, the structure of the Stirling freezer in this embodiment will be described.

The Stirling freezer shown in FIG. 1 includes a first expansion cylinder 1 and a second expansion cylinder 2. A first expansion chamber 3 in the first expansion cylinder 1 is provided with a first displacer 5 accommodating a storage medium 5a capable of reciprocation.

First displacer 5 is attached with one end of a rod 9 and the other end of rod 9 is coupled to one end of a connecting lever 17 through a movable fulcrum 13.

Movable fulcrum 13 is attached with a roller 15 which slides along a guide 11 and linearly transmits the movement of connecting lever 17 to rod 9.

Connecting lever 17 is coupled with a crank 19 at approximately the center of the connecting lever by a crank pin 17a. The other end of connecting lever 17 is movably attached to the slider 27 of a first compression piston 23 through a movable fulcrum 25.

First compression piston 23 is accommodated in a compression cylinder 21 to form a first compression chamber 31 and a second compression chamber 32 on both sides. Therefore, as shown in FIG. 1, expansion cylinder 1, connecting lever 17 and compression cylinder 21 are arranged to form a T-shape.

Meanwhile, the second expansion chamber 4 of second expansion cylinder 2 is provided with a second displacer 6 accommodating a storage medium 6a capable of reciprocation.

Second displacer 6 is attached with one end of a rod 10, the other end of which is coupled with a connecting lever 18 through a movable fulcrum 14.

Movable fulcrum 14 is attached with a roller 16 which slides along a guide 12 and linearly transmits the movement of connecting lever 18 to rod 10.

Connecting lever 18 is coupled to a crank 20 at approximately the center of the connecting lever by a crank pin 18a. The other end of connecting lever 18 is movably attached to the slider 28 of second compression piston 24 through a movable fulcrum 26.

Second compression piston 24 is accommodated in compression cylinder 22 to form a third compression chamber 33 and a fourth compression chamber 34 on both sides. Therefore, expansion cylinder 2, connecting lever 18 and compression cylinder 22 are arranged to form a T shape.

Cranks 19 and 20 are coupled by a common crank shaft 37 with a phase angle of 180 therebetween as shown in FIG. 1. Cold heads 35 and 36 are attached to the heads of first expansion cylinder 1 and second expansion cylinder 2, respectively.

First expansion chamber 3 is communicated with first compression chamber 31 and third compression chamber 33 through a first communicating tube 29, and second expansion chamber 4 is communicated with second compression chamber 32 and fourth compression chamber 34 through a second communicating tube 30.

In this Stirling freezer, as connecting levers 17 and 18 start moving by the rotation of crank shaft 37, first displacer 5 and second displacer 6 start reciprocating upwards and downwards in the figure, and first compression piston 23 and second compression piston 24 start moving to the left and right in the figure.

Note that for ease of illustration, the freezing cycle by first expansion cylinder 1 is called a first freezing cycle, and the freezing cycle by second expansion cylinder 2 is called a second freezing cycle.

Figure 2:
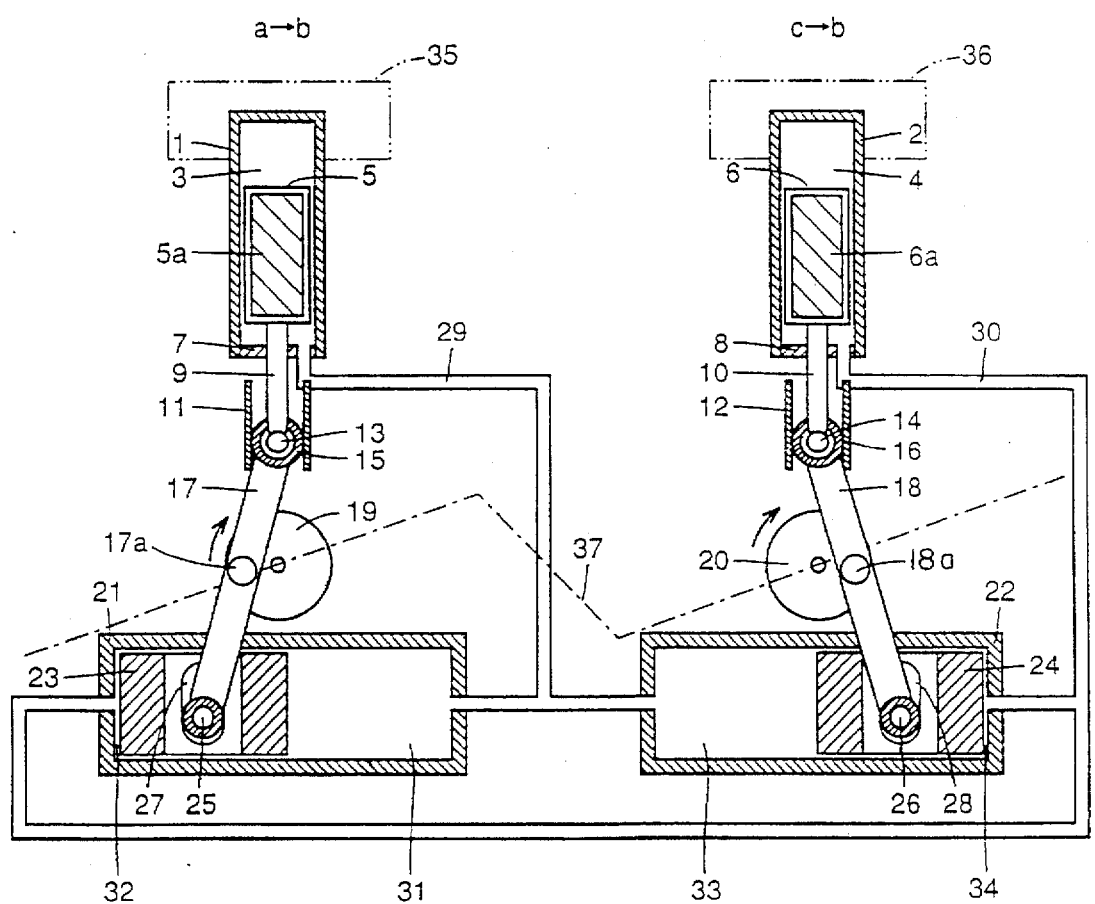
FIGS. 2 to 5 are cross sectional views showing first to fourth operation steps of the freezer according to the embodiment of the invention.
Figure 6:
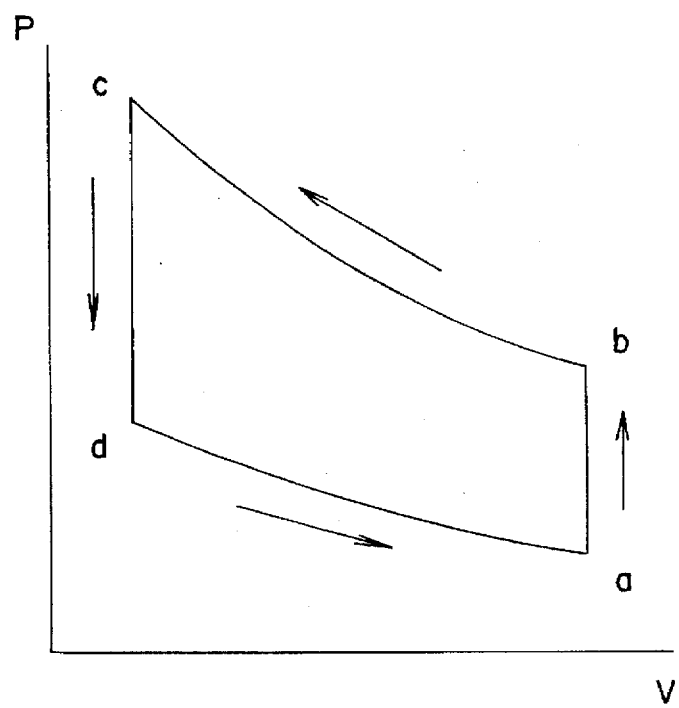
FIG. 6 is a graph for use in illustration of a freezing cycle in a Stirling freezer according to the present invention.

In the state shown in FIG. 2, the first freezing cycle corresponds to a change of the state from state a to state b in FIG. 6, the process of isometric heating with a working medium. Meanwhile, the second freezing cycle which has the phase difference of 180° with respect to the first freezing cycle is the process of isometric cooling, in other words a transition from state c to state d.

Figure 3:
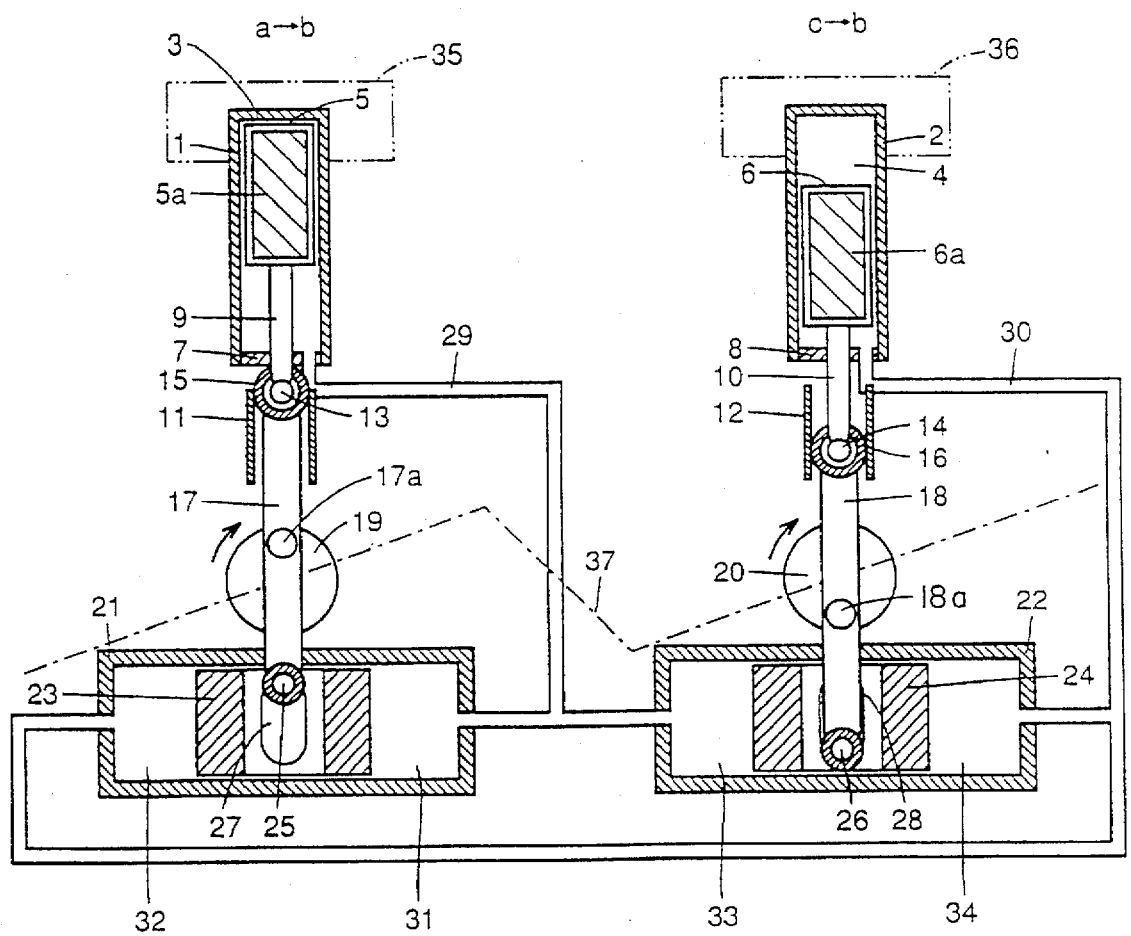

Referring to FIG. 3, a 90° transition from the state shown in FIG. 2 in the first and second freezing cycles will be described.

The first freezing cycle shows a transition from state b to state c in FIG. 6, in which the working medium increases in temperature after heat exchange with the storage medium 5a of first displacer 5, and then flows into first compression chamber 31 and third compression chamber 33 through the first communicating tube, in other words, the process of isothermal compression is shown.

The second freezing cycle shows a transition from state d to state a in FIG. 6, in which the working medium is passed through storage medium 6a in second displacer 6, and decreases in temperature after heat exchange with storage medium 6a, in other words the process of isothermal expansion is shown.

Figure 4:
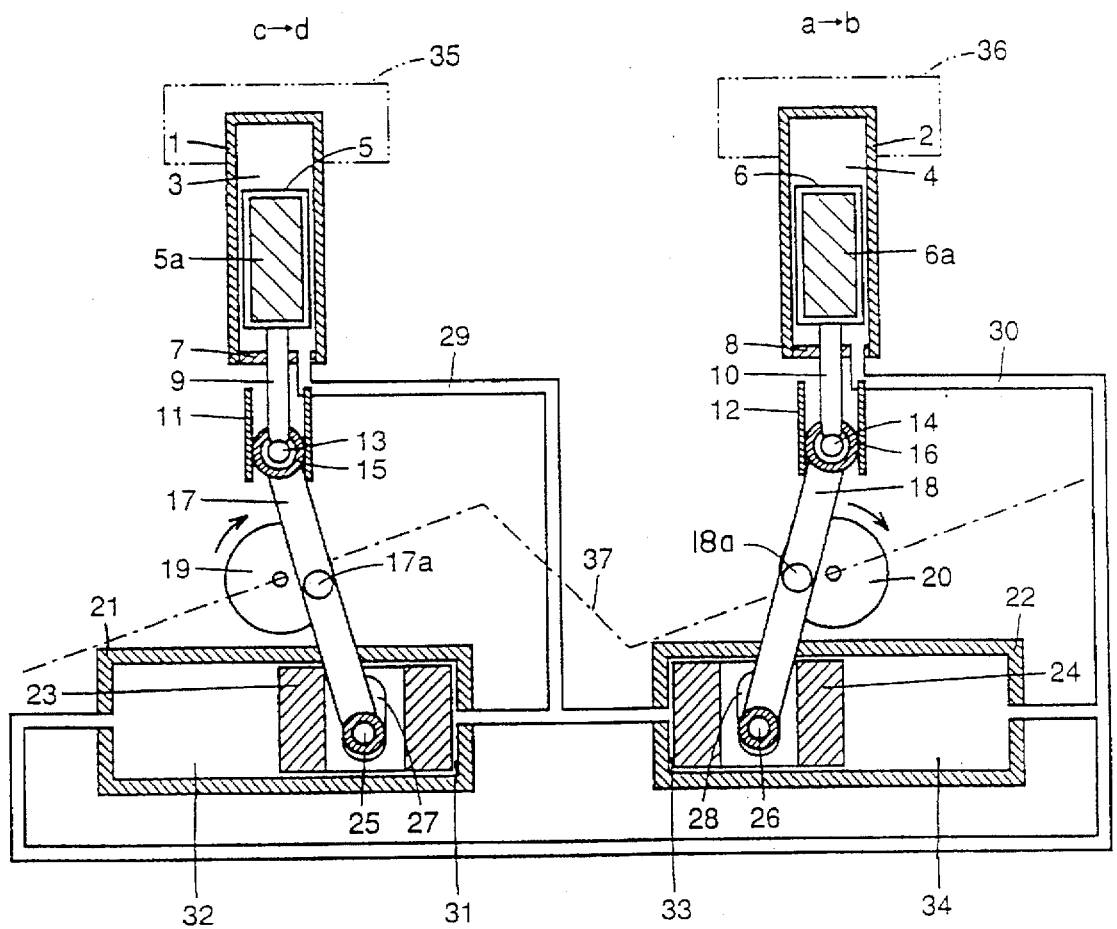

Referring to FIG. 4, a 90° transition from the state shown in FIG. 3 in the first and second freezing cycles will be described.

The first cycle shows a transition from state c to state d in FIG. 6, in which the working medium is compressed in first compression chamber 31 and third compression chamber 33 and flows into expansion chamber 3 through communicating tube 29, in other words, the process of isometric cooling is shown.

The second freezing cycle shows a transition from state a to state b in FIG. 6 in which the working medium is passed through storage medium 6a in second displacer 6, increases in temperature during gradual heat exchange with storage medium 6a, and flows into second expansion chamber 32 and fourth expansion chamber 34.

Figure 5:
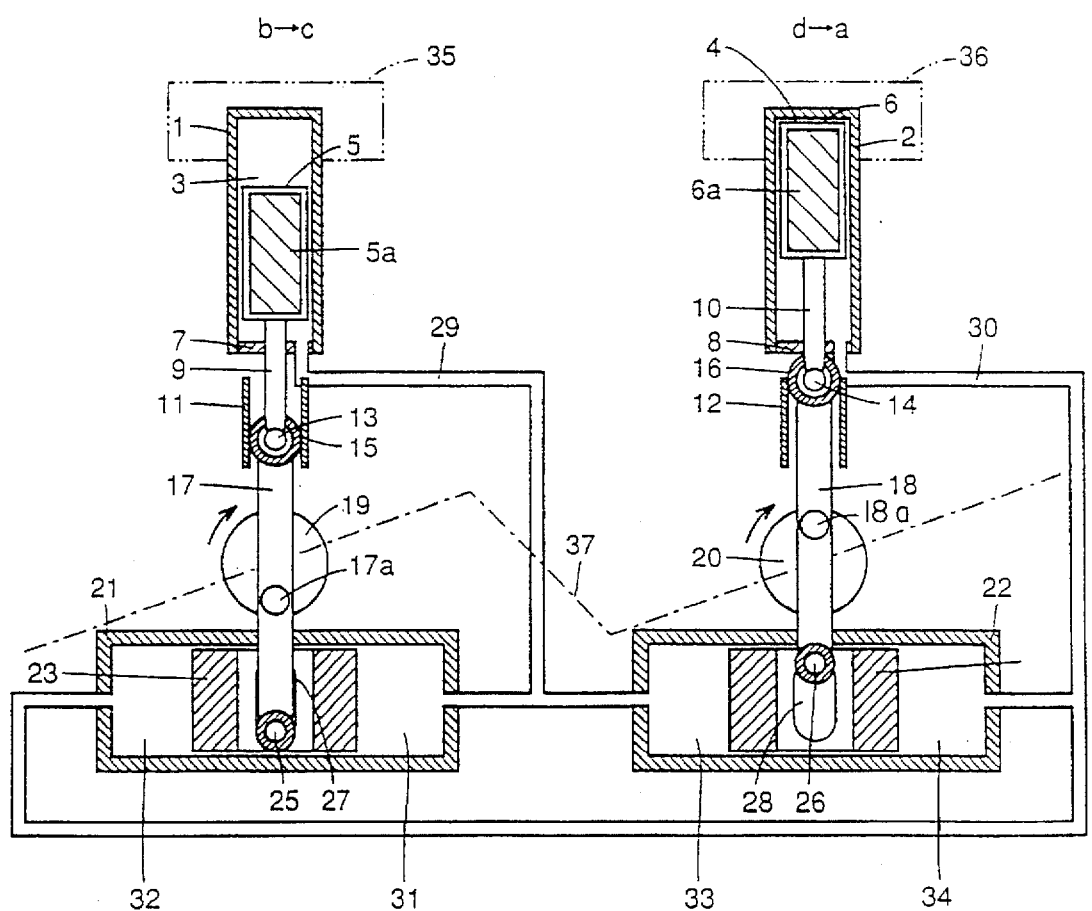

Referring to FIG. 5, a further 90° transition from the state shown in FIG. 4 in the first and second freezing cycles will be described. The first freezing cycle shows a transition from state d to state a in FIG. 6, in which the working medium is passed through storage medium 5a in first displacer 5, decreases in temperature by heat exchange with storage medium 5a, in other words the process of isothermal expansion is shown.

The second freezing cycle shows a transition from state b to state c in FIG. 6, in which the working medium increases in temperature by heat exchange with storage medium 6a in second displacer 6, and then flows into second compression chamber 32 and fourth compression chamber 34 through second communicating tube 30, in other words, the process of isothermal compression is shown.

As described above, with the phase difference of 180° between the first freezing cycle and second freezing cycle, cold heads 35 and 36 provided at the heads of expansion cylinders 1 and 2 are cooled.

As described above, in the Stirling freezer according to the described embodiment, first compression piston 23 and second compression piston 24 move in directions crossing the direction of movement of connecting levers 17 and 18, respectively. Therefore, first compression piston 23 and second compression piston 24 are not encountered with pressing forces against the insides of first compression cylinder 21 and second compression cylinder 22, and a loss of force at the crank mechanism cause by friction between first compression cylinder 23 and first piston 21, and between second compression piston 24 and second compression cylinder 22 may be prevented.

Figure 7:
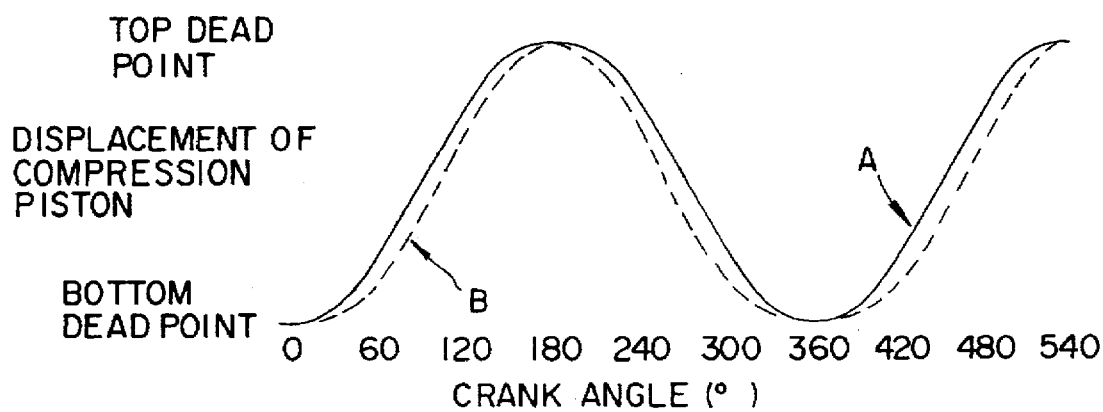
FIG. 7 is a plot for use in illustration of displacement of the compression piston of Stirling freezer according to the embodiment of the invention.
Figure 8:
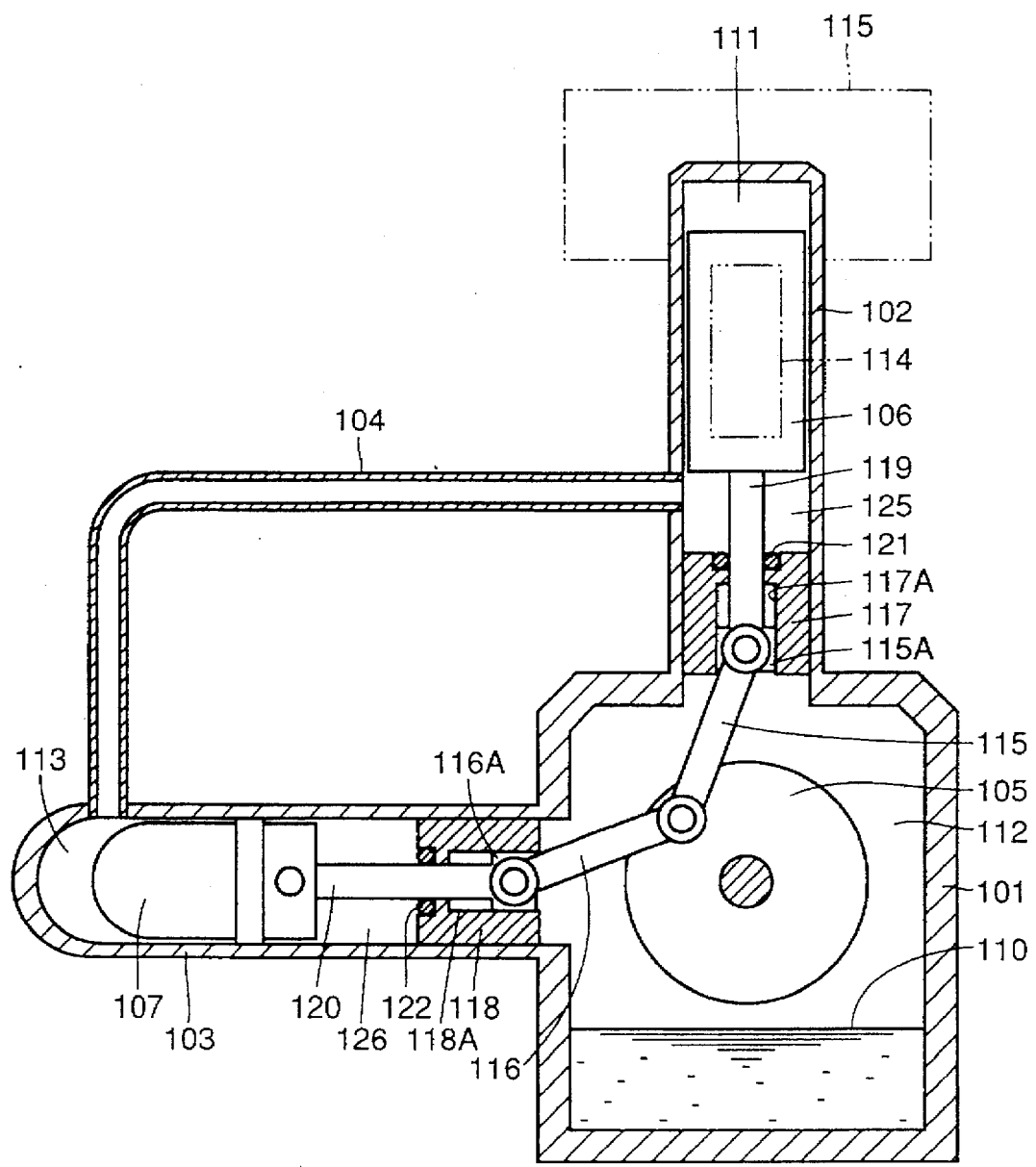
FIG. 8 is a cross sectional view showing a conventional Stirling freezer.
Figure 9:
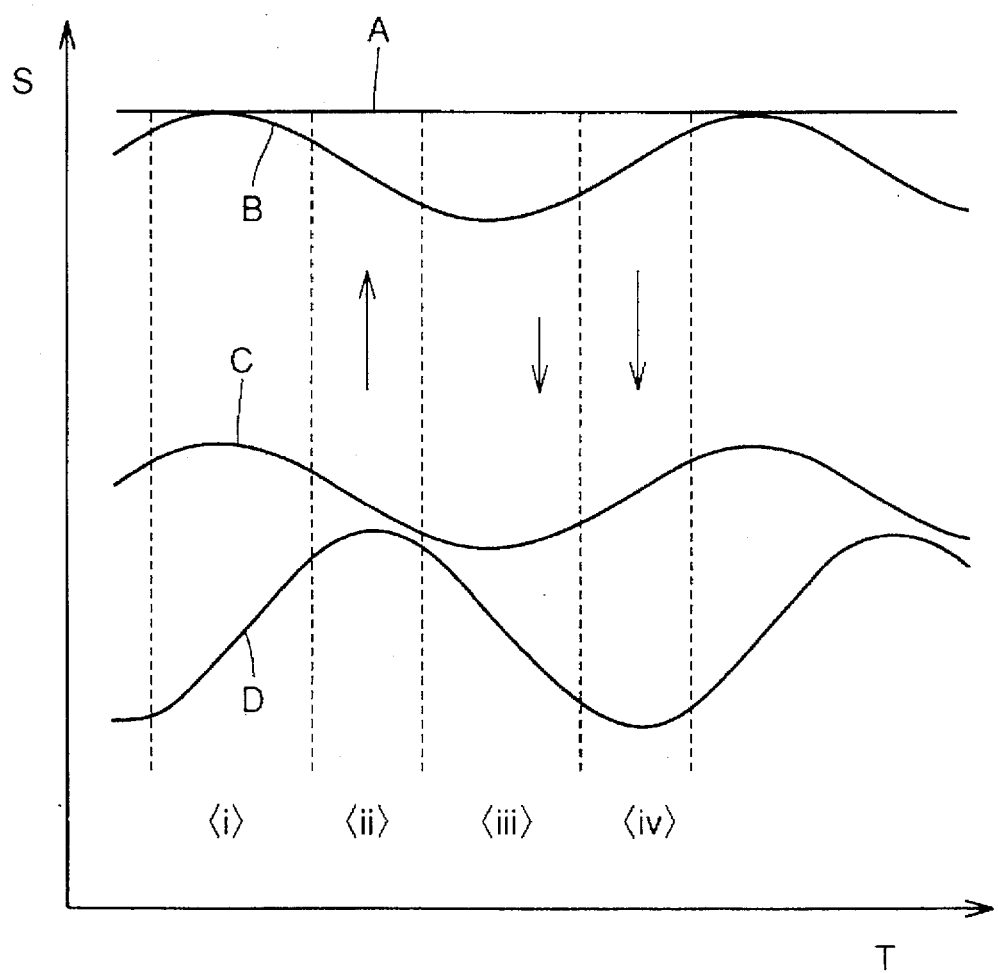
FIG. 9 is a plot for use in illustration of the process of the Stirling freezing cycle.

The displacements of first compression piston 23 and second compression piston 24 each draws a complete sine curve as denoted by solid line A in FIG. 7 and, as compared to the displacement of the conventional compression cylinder denoted by dotted line B, the time of compressing working medium by the first compression piston 23 and the second compression piston 24 may be increased, thereby improving the compression efficiency of the working medium.

In addition, as compared to the conventional Stirling freezer, the stroke of the crank mechanism portion is smaller, and therefore, the rigidity of the crank mechanism may be increased, thereby reducing oscillation.

Furthermore, since the first freezing cycle and the second freezing cycle proceed with the phase angle of 180°, first expansion chamber 3, first compression chamber 31 and third compression chamber 33 are communicated with each other through first communicating tube 29, and second expansion chamber 4, second compression chamber 32 and fourth compression chamber 34 are communicated with each other through second communicating tube 30, as the working medium is compressed in first compression chamber 31 by the function of first compression piston 23, the working medium is compressed in third compression chamber 33 by the function of second compression piston 24 at the same time, and the working medium is sent from second expansion chamber 4 to second compression chamber 32 and fourth compression chamber 34.

First compression piston 23 and second compression piston 24 therefore always have their pressures balanced under the pressures in the compression chambers formed on both sides, and therefore, reciprocation in a balanced state may be achieved.

The above-described embodiment includes two freezing cycles, the first freezing cycle and the second freezing cycle, in order to accomplish a well-balanced reciprocation of the compression pistons, but the same functions and effects may be achieved by a freezing cycle using one expansion piston and one compression piston.

In addition, the structure using a displacer accommodating a storage medium has been described, but the same functions and effects may be achieved if first communicating tube 29 and second communicating tube 30 have a storage medium therein.

It is noted the present invention may be applied to various kinds of Stirling engines as to well as gas compressor expanders besides the Stirling freezer described.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A gas compressor expander, comprising:
an expansion cylinder;
a displacer reciprocating in an expansion chamber in said expansion cylinder;
a connecting lever having one end coupled to said displacer;
a crank mechanism portion coupled to said connecting lever approximately in the center of said connecting lever for causing said displacer to reciprocate with said connecting lever therebetween;
a compression cylinder provided in a direction crossing the direction of reciprocation of said displacer at a position opposite to said expansion cylinder with said crank mechanism portion therebetween;
a compression piston coupled to another end of said connecting lever for reciprocating in a compression chamber in said compression cylinder; and
a communicating tube communicating between said expansion chamber and said compression chamber.

2. A gas compressor expander, comprising:
an expansion cylinder;
a displacer reciprocating in an expansion chamber in said expansion cylinder;
a connecting lever having one end coupled to said displacer;
a crank mechanism portion coupled to said connecting lever approximately in the center of said connecting lever for causing said displacer to reciprocate with said connecting lever therebetween;
a compression cylinder provided in a direction crossing the direction of reciprocation of said displacer at a position opposite to said expansion cylinder with said crank mechanism portion therebetween;
a compression piston coupled to another end of said connecting lever for reciprocating in a compression chamber in said compression cylinder;
a communicating tube communicating between said expansion chamber and said compression chamber;
wherein said connecting lever includes between said connecting lever and said displacer:
a rod having one end coupled to said displacer and the other end coupled to said connecting lever with a movable fulcrum therebetween;
a roller provided around said movable fulcrum; and
a guide restricting the movement of said roller such that said roller slides to linearly transmit the movement of said connecting lever according to said crank mechanism portion linearly from said rod to said displacer.

3. A gas compressor expander, comprising:
a first expansion cylinder;
a second expansion cylinder;
a first displacer reciprocating in a first expansion chamber in said first expansion cylinder;
a second displacer reciprocating in a second expansion chamber in said second expansion cylinder;
a first connecting lever having one end coupled to said first displacer;
a second connecting lever having one end coupled to said second displacer;
a first crank mechanism portion coupled to said connecting lever approximately in the center of said first connecting lever for causing said first displacer to reciprocate through said first connecting lever;
a second crank mechanism portion having a phase difference of 180° to said first crank mechanism portion and coupled to said second connecting lever approximately in the center of said second connecting lever for causing said second displacer to reciprocate through said second connecting lever;
a first compression cylinder having a first compression chamber and a second compression chamber provided in a direction crossing the direction of reciprocation of said first displacer at a position opposite to said first expansion cylinder with said first crank mechanism therebetween;
a second compression cylinder having a third compression chamber and a fourth compression chamber provided in a direction crossing the direction of reciprocation of said second displacer at a position opposite to said second expansion cylinder with said second crank mechanism therebetween;
a first compression piston coupled to the other end of said first connecting lever for reciprocating between said first compression chamber and said second compression chamber;
a second compression piston coupled to the other end of said second connecting lever for reciprocating between said third compression chamber and said fourth compression chamber;
a first communicating tube communicating between said first expansion chamber, said first compression chamber, and said third compression chamber; and a second communicating tube communicating between said second expansion chamber, said second compression chamber, and said fourth compression chamber.

4. The gas compressor expander as recited in claim 3, wherein said first connecting lever includes between said first connecting lever and said first displacer:

a first coupling rod having one end coupled to said first displacer and the other end coupled to said first connecting lever through a movable fulcrum;

a roller provided around said movable fulcrum; and a guide for restricting the movement of said roller such that said roller slides to linearly transmit the movement of said first connecting lever according to said crank mechanism from said rod to said first displacer and, wherein said second connecting lever includes between said second connecting lever and said second displacer:

a second coupling rod having one end coupled to said second displacer and the other end coupled to said second connecting lever through a movable fulcrum;

a roller provided around said movable fulcrum; and a guide for restricting the movement of said roller such that said roller slides to linearly transmit the movement of said second connecting lever according to said crank mechanism portion from said rod to said second displacer.

* * * * *